(12) United States Patent
Simon et al.

(10) Patent No.: US 9,841,510 B2
(45) Date of Patent: Dec. 12, 2017

(54) RADIATION DETECTOR WITH PHOTOSENSITIVE ELEMENTS THAT CAN HAVE HIGH ASPECT RATIOS

(71) Applicant: KONINKLIJKE PHILIPS N.V., Eindhoven (NL)

(72) Inventors: Matthias Simon, Aachen (DE); Frank Verbakel, Helmond (NL); Gereon Vogtmeier, Aachen (DE); Naor Wainer, Zichron Yaakov (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/304,542

(22) PCT Filed: Apr. 13, 2015

(86) PCT No.: PCT/EP2015/057935
§ 371 (c)(1),
(2) Date: Oct. 17, 2016

(87) PCT Pub. No.: WO2015/158646
PCT Pub. Date: Oct. 22, 2015

(65) Prior Publication Data
US 2017/0045630 A1 Feb. 16, 2017

(30) Foreign Application Priority Data
Apr. 17, 2014 (EP) .................................. 14165094

(51) Int. Cl.
*G01T 1/20* (2006.01)

(52) U.S. Cl.
CPC .................................. *G01T 1/2018* (2013.01)

(58) Field of Classification Search
CPC ...................................................... G01T 1/2018
See application file for complete search history.

(56) References Cited

U.S. PATENT DOCUMENTS 6,921,909 B2 * 7/2005 Nagarkar ................. G21K 4/00
250/363.01
7,304,309 B2 12/2007 Suhami
7,525,170 B2 4/2009 Hsu
(Continued)

FOREIGN PATENT DOCUMENTS

DE 102012206180 10/2013

OTHER PUBLICATIONS v. Eijk, "Inorganic Scintillators in Medical Imaging detectors", Nuclear Instruments and Methods A v. 509, 17-25, 2003.
(Continued)

*Primary Examiner* — David Porta
*Assistant Examiner* — Djura Malevic

(57) ABSTRACT

The invention relates to a radiation detector (100) and to a method for manufacturing such a detector. In a preferred embodiment, the radiation detector (100) comprises an array of photosensitive pillars (110) that are embedded in a conversion material (120). The photosensitive pillars may particularly be diodes connected at their ends to external circuits (130, 140). The conversion material (120) may particularly comprise a powder of scintillator particles (121) embedded in a matrix of binder.

18 Claims, 1 Drawing Sheet

(56) References Cited

U.S. PATENT DOCUMENTS

| | | | |
|---|---|---|---|
| 2002/0153492 A1* | 10/2002 | Sekine | G01T 1/2018 250/370.11 |
| 2006/0289777 A1* | 12/2006 | Li | G01T 1/24 250/370.14 |
| 2007/0272872 A1* | 11/2007 | Joshkin | G01T 1/2018 250/370.11 |
| 2008/0083963 A1 | 4/2008 | Hsu | |
| 2009/0309648 A1 | 12/2009 | Zheng | |
| 2010/0155872 A1 | 6/2010 | Park | |
| 2010/0200760 A1 | 8/2010 | Baeumer | |
| 2011/0207260 A1 | 8/2011 | Masuoka | |
| 2012/0267539 A1 | 10/2012 | Shinba | |

OTHER PUBLICATIONS

Sadrozinski Hartmut F-W Ed—Unno Yoshinobu, et al., "Particle detector applications in medicine", Nuclear Instruments & Methods in Physics Research. Section A: Accelerators, Spectrometers, Detectors, and Associated Equipment, vol. 732, Jun. 11, 2013.

* cited by examiner

RADIATION DETECTOR WITH PHOTOSENSITIVE ELEMENTS THAT CAN HAVE HIGH ASPECT RATIOS

CROSS REFERENCE TO RELATED APPLICATIONS

This application is the U.S. National Phase application under 35 U.S.C. §371 of International Application No. PCT/EP2015/057935, filed Apr. 13, 2015, published as WO 2015/158646 on Oct. 22, 2015, which claims the benefit of European Patent Application Number 14165094.5 filed Apr. 17, 2014. These applications are hereby incorporated by reference herein.

FIELD OF THE INVENTION

The invention relates to a radiation detector for detecting primary photons of incident radiation and to a method for manufacturing such a radiation detector.

BACKGROUND OF THE INVENTION

The US 2010/0200760 A1 discloses a radiation detector for CT (Computed Tomography) scanners. The detector comprises a stack of scintillator elements and photodiode arrays, wherein the latter are arranged in a volume lateral of the scintillator elements.

The US 2007/272872 discloses an X-ray detector that includes one or more photodetectors embedded in scintillating material. The photodetectors may have a needle-like, a column-like, or a ridge-like structure.

The DE 10 2012 206180 A relates to an X-ray detector comprising a scintillator which embeds a photo-guide that converts secondary photons into electrical signals.

SUMMARY OF THE INVENTION

It would be advantageous to provide a radiation detector for the detection of incident radiation, particularly of ionizing radiation, which allows for a simplified manufacturing procedure.

This object is addressed by a radiation detector according to claim 1 and a manufacturing method according to claim 2. Preferred embodiments are disclosed in the dependent claims.

According to a first aspect, an embodiment of the invention relates to a radiation detector for detecting primary photons of incident radiation, particularly of ionizing radiation such as X-rays or gamma rays. The radiation detector comprises the following components:

A conversion material that can convert primary photons of incident radiation into secondary photons.

At least two photosensitive pillars that extend in a first direction through the aforementioned conversion material and that can convert said secondary photons into electrical signals, wherein at least two of said photosensitive pillars have different heights and/or different positions on an axis parallel to the first direction. The "conversion material" may be or comprise some scintillator material that can convert high-energy primary photons into one or (typically) more lower-energy secondary photons, particularly secondary photons in the range of the visible spectrum.

The term "photosensitive pillar" refers to a structure or component that is sensitive to secondary photons generated in the conversion material and that typically has a pillar-like shape, for example the shape of a column or cylinder with a circular, elliptical, polygonal or arbitrary cross section. The shape of the "photosensitive pillar" has some geometrical axis of extension that defines the above-mentioned "first direction".

Moreover, the "extension" of the pillar through the conversion material means that the pillar is at least partially embedded in the conversion material, particularly embedded in a plane perpendicular to the first direction. Typically only the end faces of the pillar will not be covered by conversion material (to remain accessible by external circuits).

During usage, the radiation detector is typically oriented such that the (main or average) direction of incidence of the incident radiation is parallel to the first direction, i.e. to the extension direction of the photosensitive pillars.

According to a second aspect, an embodiment of the invention relates to a method for manufacturing a radiation detector for detecting primary photons of incident radiation, particularly a radiation detector of the kind described above. The method comprises the following steps, which can be executed in the listed or any other appropriate order:

a) Producing at least two photosensitive pillars that extend in a first direction and that can convert secondary photons into electrical signals, wherein at least two of said photosensitive pillars have different heights and/or different positions on an axis parallel to the first direction.

b) Embedding said photosensitive pillars in a conversion material that can convert primary photons of incident radiation into said secondary photons.

c) Connecting the photosensitive pillars to electrical circuits.

As a radiation detector of the kind described above can be manufactured by the described method, explanations provided for said radiation detector are analogously valid for the method, too, and vice versa.

In the described radiation detector and method, the photosensitive pillars that have different heights and/or different positions on an axis parallel to the first direction are connected to separate electrical circuits such that their signals can independently be read out (perhaps in combination with other signals).

The radiation detector and the manufacturing method have the advantage that they allow for the provision of cost-effective radiation detectors with high sensitivity. This is because the photosensitive pillars of the detector can be oriented parallel to the direction of radiation incidence such that the conversion material can be provided with a sufficient thickness (in radiation direction) for completely converting incident primary photons while at the same time the generated secondary photons can reach the photosensitive pillar on a short route (perpendicular to the radiation direction), thus minimizing signal losses.

In the following, various preferred embodiments of the invention will be explained that can be realized with both the radiation detector and the manufacturing method (even if they are described in detail only for one of these embodiments). The conversion material may for example be provided as a one-piece part, for example as a large solid crystal. In a preferred embodiment, the conversion material comprises a plurality of conversion particles, i.e. particles of a material which can convert primary photons into secondary photons. This has the advantage that the conversion material can be provided and processed as a powder which typically is much cheaper and easier to handle than large crystals. The (average) diameter of said conversion particles is preferably less than about 10 µm, less than about 1 µm, less than about 100 nm, or most preferably less than about 10 nm.

The conversion material and/or the aforementioned conversion particles may in general comprise any material that can convert incident primary photons in an energy range of interest with a desired efficiency into secondary photons. For example, the conversion material and/or particles may comprise at least one material selected from the group consisting of alkali-halides (e.g. CsI), GOS ($Gd_2O_2S$), garnets, YGdOx, CWO ($CdWO_4$), Lanthanide-halides (e.g. $LaBr_3$), and $SrI_2$. Further suited materials may be found in literature (e.g. v. Eijk, "Inorganic Scintillators in Medical Imaging", Nuclear Instruments and Methods A v. 509, 17-25, 2003, incorporated herein by reference).

In the above-mentioned conversion material comprising conversion particles, said particles may preferably be embedded in some matrix material. The matrix material may for example be some binder such as an epoxy resin. The matrix material is preferably a material that is substantially transparent for primary and secondary photons. Suitable transparent materials may be polycarbonates, polyimides, polyurethane, silicone, or other polymers.

At least one of the photosensitive pillars is preferably made from a semiconductor material, for example from silicon. This allows for the application of well-known and versatile manufacturing technologies.

In another embodiment, at least one of the photosensitive pillars comprises at least one photodiode, particularly a photodiode comprising a semiconductor material that is structured by appropriate doping. Photodiodes are well-known components which can convert secondary photons into electrical signals, particularly into charge signals that can be sensed by external circuits connected to the photodiode.

In a further embodiment, at least one of the photosensitive pillars comprises a stack of at least two photosensitive elements, for example of photodiodes of the kind described above. Said photosensitive elements are preferably stacked one behind the other in the extension direction of the pillar ("first direction"). If these photosensitive elements are individually connected to external circuits, and if the incident radiation is parallel to the first direction of the pillar, it is possible to detect the depth of interaction where the conversion of a primary photon into secondary photons has taken place. As this depth of interaction usually increases with increasing energy of the incident primary photons, this allows for an energy discrimination of incident photons. In general, the geometry and dimensions of the sensitive pillars may be quite arbitrary. In a preferred embodiment, the height of at least one of the photosensitive pillars (measured in the first direction) is larger than about 0.5 mm, larger than about 1 mm, larger than about 2 mm, larger than about 3 mm, or larger than about 5 mm. Additionally or alternatively, the at least one of photosensitive pillars may have a diameter (measured perpendicular to the first direction and, for a non-circular cross-section, defined as the largest extension of the cross-section) that is smaller than about 500 µm, smaller than about 400 µm, or a smaller than about 200 µm.

The ratio between the aforementioned height and diameter of the photosensitive pillars is called its "aspect ratio". Independent of the aforementioned figures, this aspect ratio may preferably be larger than about 2, larger than about 3, larger than about 5, or most preferably larger than about 10. A high aspect ratio is desirable for two reasons: First, it provides for a high thickness of the conversion material, thus guaranteeing a most complete conversion of incident primary photons. Secondly, the area covered by the photosensitive pillar is kept small, thus minimizing losses due to regions that are insensitive to primary photons.

In another preferred embodiment of the invention, there is an array of two or (many) more photosensitive pillars which are embedded in the same conversion material. Optionally the radiation detector may comprise a plurality of blocks of conversion material, each block containing an array of photosensitive pillars. Because each photosensitive pillar typically embodies one pixel or a part of one pixel of the radiation detector, the total number of pillars will in general be larger or equal to the number of pixels of the detector.

The aforementioned array of photosensitive pillars may have any appropriate structure, for example with a regular arrangement of the pillars, e.g. in a hexagonal, rectangular or square grid, or the pillars may be arranged in an irregular pattern. The spatial density of pillars may be uniform throughout the whole sensitive area of the detector. Alternatively, it may vary, yielding regions of higher and regions of lower spatial resolution.

In a preferred embodiment of a radiation detector with a plurality of photosensitive pillars, said pillars may be arranged with a spatial density of more than about 5 pillars per $mm^2$, more than about 10 pillars per $mm^2$, or most preferably more than about 20 pillars per $mm^2$ (measured with respect to a plane perpendicular to the first direction). Additionally or alternatively, the average mutual distance between neighboring photosensitive pillars may be less than about 1000 µm, less than about 500 µm, less than about 300 µmm, or most preferably less than about 100 µm.

A photosensitive pillar and/or an array of photosensitive pillars may optionally be manufactured starting with a bulk layer of the photosensitive material by subtractive techniques such as Reactive Ion Etching (RIE), Deep Reactive Ion Etching (DRIE) [e.g. 'Bosch process'], Electrochemical Etching (EE), wet etching and/or laser structuring. Alternatively at least one of the photosensitive pillars and/or an array of photosensitive pillars may be manufactured by starting with a bulk layer of conversion material (e.g. matrix material containing conversion material particles). After creating holes in this layer, e.g. by one of the aforementioned subtractive techniques such as laser structuring, they can be filled with photosensitive material(s) in a $2^{nd}$ step to create the photosensitive pillars.

The electrical signal that is generated by the photosensitive pillars indicates the occurrence of conversion events in the adjacent conversion material and hence reveals the associated primary photons. Optionally the strength of this signal may provide an indication of the energy deposited by said primary photons. If the radiation detector comprises an array of photosensitive pillars, a spatial resolution of detected incident radiation (i.e. an imaging function) can be achieved if the signals of subgroups of photosensitive pillars can individually be read out. A maximal spatial resolution is achieved if each such subgroup comprises just one photosensitive pillar (i.e. if each pillar corresponds to one pixel of the detector).

In a preferred embodiment, a switching structure is provided in connection with the photosensitive pillars by which different subgroups of photosensitive pillars of the array can selectively be read out. This means that the spatial resolution of the radiation detector can selectively be changed, allowing for example to sacrifice spatial resolution (by combining several neighboring photosensitive pillars into a single subgroup or "super pixel") for the benefit of readout velocity, data reduction, and/or sensitivity.

If the radiation detector comprises an array of several photosensitive pillars, these pillars may all have the same geometry. Alternatively, at least two of the pillars may differ in at least one geometrical parameter, for example in their diameter, their height, and/or their position on an axis parallel to the first direction. In the latter two examples (different height or axial position), some indication of the depth of interaction may be conveyed by the signals of the pillars, thus additionally providing information about the energy of the incident photons.

According to a third aspect, an embodiment of the present invention relates to an imaging apparatus, particularly an X-ray device, a CT (Computed Tomography) scanner, a PET scanner, or a SPECT scanner, said apparatus comprising a radiation detector according to any of the embodiments described above. Usage of such a radiation detector in a CT scanner is for example advantageous as such a scanner typically requires detectors covering large two-dimensional areas but should nevertheless be cost-effective.

According to a fourth aspect, an embodiment of the present invention relates to a method for reading out data from a radiation detector of the kind described above which comprises an array of several photosensitive pillars embedded in the same conversion material. According to this method, the photosensitive pillars of the array are (dynamically) subdivided into different subgroups depending on given requirements of sensitivity and spatial resolution, wherein the pillars of each subgroup are commonly read out (i.e. yield one common signal). In general, sensitivity of a subgroup of pillars will increase with the number of pillars it contains while spatial resolution will decrease, and vice versa. For a given application such as an imaging task, partitions of all available photosensitive pillars into disjoint subgroups can hence be found that are a satisfactory compromise between required sensitivity and required spatial resolution.

As already indicated above, the radiation detector may comprise means (and/or the method may comprise a step) with which the mean depth of interaction of converted photons is sensed by exploiting the fact that at least two pillars have different heights and/or different positions along the first direction. A signal received from a pillar implicitly comprises the information that an interaction (conversion of a photon) took place near said pillar, and thus information about the depth of interaction if the height and/or positon of said pillar are known.

Further, as already indicated above, the radiation detector may comprise means (and/or the method may comprise a step) with which the energy of incident photons is discriminated by exploiting the fact that at least two pillars have different heights and/or different positions along the first direction. This approach is based on the fact that photons of higher energy will usually be converted at higher depth, which allows for inferring the energy of the photon from the depth of interaction.

Two or more pillars that have the same height and/or position along the first direction may optionally be combined into a subgroup of pillars which are commonly read out (they may for example all be connected to the same signal line).

According to another embodiment of the invention, the conversion material may consist of two or more different types of materials which are arranged one behind the other in the first direction. Incident photons will hence pass sequentially through these different conversion materials, yielding different reactions in terms of secondary photons.

BRIEF DESCRIPTION OF THE DRAWINGS

These and other aspects of the invention will be apparent from and elucidated with reference to the embodiments described hereinafter.

In the drawings.

Like reference numbers refer in the Figures to identical or similar components.

DETAILED DESCRIPTION OF EMBODIMENTS

Computed tomography (CT) detectors are typically provided with quite expensive crystalline and pixilated scintillators, which are difficult to manufacture. It would therefore be desirable to have a more cost-effective manufacturing technology for radiation detectors such as detectors to be used in CT scanners.

In view of this objective, it is proposed to build a detector for ionizing radiation comprising an array of vertical photodiodes (if the direction of radiation incidence is assumed to be "vertical") in a pillar-like structure with scintillating material filled in the volume between the pillars. The photodiodes may preferably be made of silicon and have top and bottom electrical contacts. Usually several photodiodes form a pixel, which will result in one element of the final image. The scintillator composite material may preferably consist of micro- or nanometer sized scintillator particles embedded in a transparent matrix (binder). It is typically easy to fill in such a matrix material with known techniques for liquids or pastes.

Figure 1:
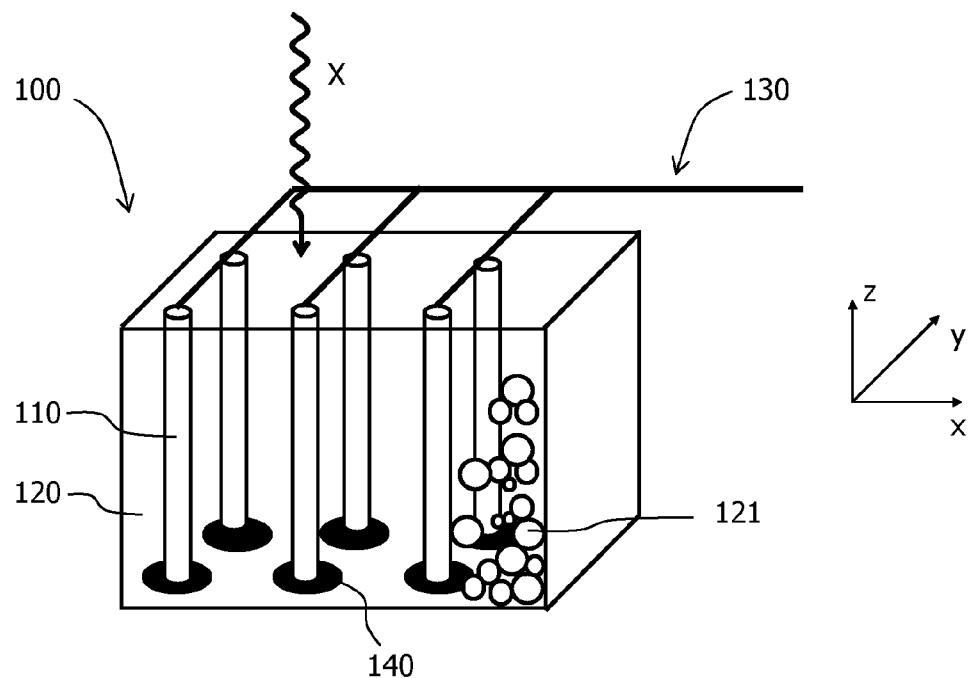
FIG. 1 schematically shows a perspective view of a radiation detector according to an embodiment of the present invention.
Figure 2:
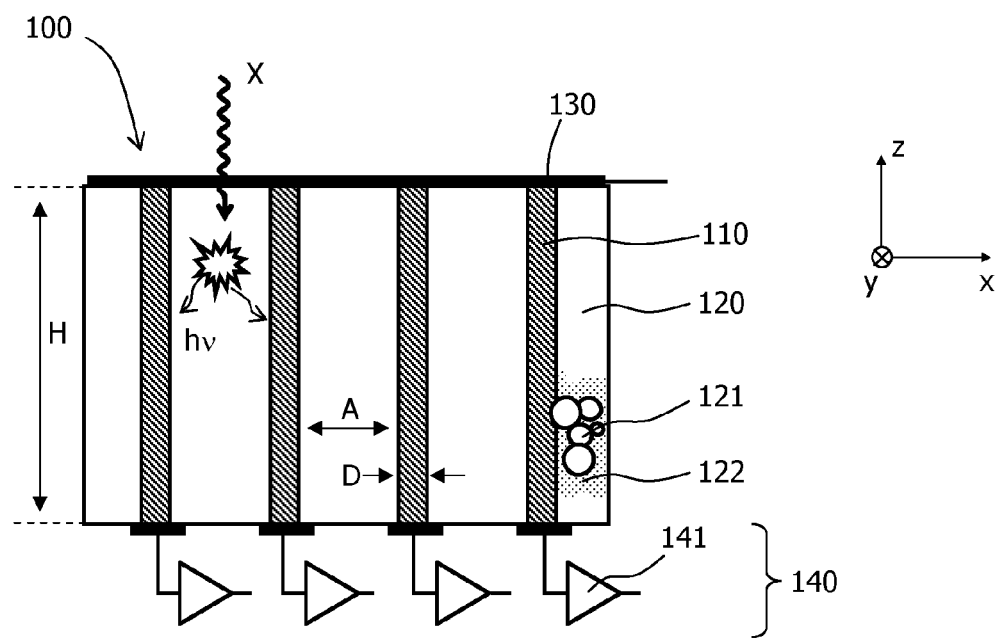
FIG. 2 shows a cross section through the radiation detector of FIG. 1.

FIGS. 1 and 2 illustrate an exemplary embodiment of a radiation detector 100 that is designed according to the above principles. As a main component, this radiation detector 100 comprises an array of photosensitive pillars 110 that are embedded in a conversion material 120. In the shown embodiment, the conversion material comprises a powder of conversion particles 121 which are embedded in a transparent matrix material 122.

The photosensitive pillars 110 extend with their axes in a "first direction", which is the vertical z-direction in the Figures and which is assumed to be parallel to the (average) direction of incidence of primary photons X of the radiation to be detected. As schematically indicated in FIG. 2, incident primary photons X are converted somewhere in the conversion material 120 (the higher the energy of the incident photon X, the larger the depth of conversion) into one or typically several secondary photons hv (usually photons of the visible spectrum). At least some of the secondary photons reach an adjacent photosensitive pillar 110, where they are converted into electrical signals.

The aforementioned electrical signals (e.g. charge signals) produced in the photosensitive pillars 110 are indications of a nearby conversion event (and hence of the associated incident photon X). They can be read out by lines or circuits 130, 140 that are connected to the top and bottom of the pillars 110. In the shown example, the top ends of the pillars 110 are all connected to a common line 130 (e.g. ground). In contrast to this, the bottom ends of the pillars 110 are individually connected to circuits 140 comprising for example amplifiers 141 that forward the signals to subsequent electronics for further processing and evaluation (not shown).

The photodiode pillars 110 have a high aspect ratio H:D (typically larger than about 5 to 10) because their height H should span the full thickness of the scintillation layer. This has to be thick, preferably about 1-2 mm, to provide high X-ray absorption. However, also a stack of two or more layers might be possible.

The diameter D of the pillars 110 should be small to keep a high volume fill factor of the scintillator layer. The preferred distance A between the photodiode pillars is given by the mean light transport length in the scintillator layer and is in the order of about 100 µm to 300 µm. The pillars can be situated on a regular pattern (rectangular, hexagonal, or others), but can also be distributed on arbitrary places, wherein the mean number per area should preferably be more or less constant.

The invention thus solves the problem that light transport only works on short range (typically about 10 µm to about 100 µm), but electrical charges have to be transported over the full thickness of the scintillator layer (typically more than 1 mm).

Bottom and top electrical contacts can be connected for each pillar 110 individually. Also groups of photodiodes, e.g. those forming a pixel or sub-pixel element, can be connected together to a common readout line. The bottom contact 140 can simply be made of metal lines; the top contacts 130 can be a common one to all or several diodes.

Fabrication of Si pillars 110 with high aspect ratio (e.g. larger than 10) can be done e.g. by (Deep) Reactive Ion Etching (DRIE, cf. U.S. Pat. No. 7,525,170 B2), or by Electrochemical Etching (EE) and/or laser structuring or wet etching.

The scintillator can be a powder composite layer comprising e.g. GdOx-Sulfide. The light transport length in these layers is usually limited so that maximum thicknesses are in the order of 300 µm to maintain a high light yield. This thickness is not sufficient for the X-ray stopping power needed for example for CT detectors. In the proposed structure the layer can be much thicker than a millimeter, because after an interaction with X-ray photons the most likely nearest detection point for visual light photons hv is in the horizontal direction at maximum half the distance A between the pillar photodiodes. Crosstalk is simply limited by the light transport length in the composite scintillator although the pixels do not need any reflecting confinement.

In an optional embodiment of the described detector, a switching structure can be introduced in the bottom and/or top contact to enable the connection of different numbers of photodiodes to one pixel readout. This would allow for a flexible pixel size, i.e. a sub-pixilation of larger pixels defined by the anti-scatter grid. Such a technology can for instance be used for an effective high resolution CT.

Additionally or alternatively, the pillars could be made of different height, e.g. on a regular alternating pattern. This would allow for sensing different mean depth of interaction of the X-ray quanta, i.e. an energy discrimination of the impinging X-ray quanta.

In summary, an embodiment of a detector for ionizing radiation has been described which consists of a vertical photodiode arrangement in the form of pillars spanning the whole thickness of the conversion layer. Between the pillars a composite scintillator converts X-ray radiation into visible photons. The detector makes it possible to use inexpensive scintillator composites for CT without the drawback of low light yield and high crosstalk. The proposed combination of vertical photodiodes and a scintillator layer may preferably be used in Computed Tomography (CT) detectors, but is also possible for other types of detectors for ionizing radiation (e.g. X-ray, PET, SPECT).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A radiation detector for detecting primary photons of an incident radiation, comprising:
   a conversion material for converting primary photons of incident radiation into secondary photons;
   at least two photosensitive pillars that extend in a first direction through said conversion material for converting said secondary photons into electrical signals,
   wherein at least two of the at least two photosensitive pillars have different heights and/or different positions on an axis parallel to the first direction that discriminate a difference in depth of said converted primary photons into said secondary photons in said conversion material,
   wherein a ratio of a height to a diameter of each of the at least two photosensitive pillars is larger than 2.

2. The radiation detector according to claim 1, characterized in that the conversion material comprises a plurality of conversion particles.

3. The radiation detector according to claim 2, characterized in that the conversion particles are embedded in a matrix material.

4. The radiation detector according to claim 1, characterized in that at least one of the photosensitive pillars comprises a semiconductor material, preferably silicon.

5. The radiation detector according to claim 1, characterized in that at least one of the photosensitive pillars comprises at least one photodiode.

6. The radiation detector according to claim 1, characterized in that at least one of the photosensitive pillars comprises a stack of at least two photosensitive elements, wherein said photosensitive elements are preferably stacked one behind the other in the first direction.

7. The radiation detector according to claim 1, characterized in that at least one of the photosensitive pillars has a height larger than about 3 mm.

8. The radiation detector according to claim 1, characterized in that the radiation detector comprises an array of several photosensitive pillars that are embedded in the same conversion material.

9. The radiation detector according to claim 8, characterized in that different subgroups of photosensitive pillars of the array can selectively be read out.

10. A method for reading out data from a radiation detector according to claim 9, characterized in that the photosensitive pillars of the array are subdivided into different subgroups depending on given requirements of sensitivity and spatial resolution, wherein the pillars of each subgroup are commonly read out.

11. The radiation detector according to claim 8, characterized in that the photosensitive pillars of the array have
a density of more than about 5 pillars per mm2, and/or a mutual distance of less than about 500 μm.

12. The radiation detector according to claim 1, characterized in that the photosensitive pillars are produced by Reactive Ion Etching, Deep Reactive Ion Etching, Electrochemical Etching, wet etching and/or laser structuring starting from a bulk layer of photosensitive material or from a bulk layer of conversion material.

13. An imaging apparatus, comprising at least one selected from a group comprised of an X-ray device, a CT scanner, a PET scanner, and a SPECT scanner, comprising the radiation detector according to claim 1.

14. The radiation detector of claim 1, wherein a ratio of a height to a diameter of each of the at least two photosensitive pillars is larger than 10.

15. A method for manufacturing a radiation detector for detecting primary photons of incident radiation, said method comprising the following steps:
a) producing at least two photosensitive pillars that extend in a first direction and that can convert secondary photons (hv) into electrical signals, wherein at least two of the photosensitive pillars have different heights and/or different positions on an axis parallel to the first direction configured to discriminate a difference in depth of converting primary photons into said secondary photons in a conversion material;
wherein a ratio of a height to a diameter of each of the at least two photosensitive pillars is larger than 2;
b) embedding the photosensitive pillars in said conversion material that can convert said primary photons of incident radiation into said secondary photons;
c) connecting the photosensitive pillar to electrical circuits.

16. A radiation detector for detecting primary photons of an incident radiation, comprising:
a conversion material for converting primary photons of incident radiation into secondary photons;
a plurality of photosensitive pillars that extend in a first direction through said conversion material for converting said secondary photons into electrical signals;
wherein at least two of the at least two photosensitive pillars have different heights and/or different positions on an axis parallel to the first direction that discriminate a difference in depth of said converted primary photons into said secondary photons in said conversion material;
wherein the radiation detector comprises an array of a plurality of photosensitive pillars that are embedded in the same conversion material, wherein the photosensitive pillars of the array comprise at least one selected from a group comprising of a density of more than 5 pillars per mm$^2$ and a mutual distance of less than 500 μm.

17. The radiation detector of claim 16, wherein a ratio of a height to a diameter of each of the plurality of photosensitive pillars is larger than 10.

18. The radiation detector of claim 17, wherein the height of each of the plurality of photosensitive pillars is larger than 3 mm.

* * * * *